June 1, 1937.  E. JACOBSEN  2,082,579
COLOR PHOTOGRAPHY
Filed March 19, 1936   2 Sheets-Sheet 1
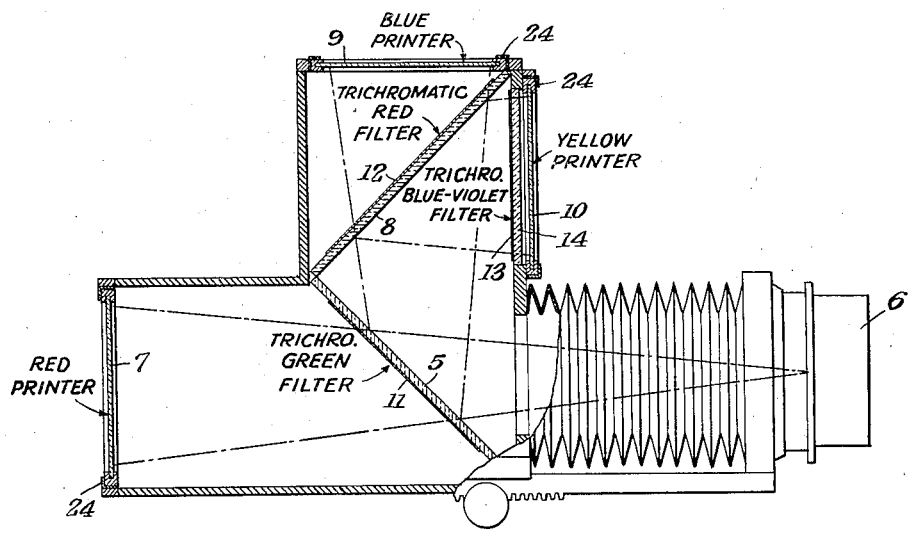
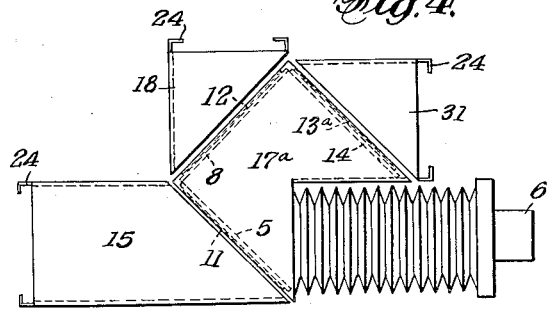
EDWARD JACOBSEN
INVENTOR
BY *Philip S. McGean*
ATTORNEY June 1, 1937.  E. JACOBSEN  2,082,579
COLOR PHOTOGRAPHY
Filed March 19, 1936   2 Sheets-Sheet 2

EDWARD JACOBSEN
INVENTOR
BY
ATTORNEY

Patented June 1, 1937

2,082,579

UNITED STATES PATENT OFFICE 2,082,579

COLOR PHOTOGRAPHY

Edward Jacobsen, New York, N. Y.

Application March 19, 1936, Serial No. 69,683

6 Claims. (Cl. 95—2)

This invention relates to color photography and particularly to what are known as one shot color cameras, in which exposure of all the color plates is effected simultaneously.

Special objects of the invention are to provide a camera of this type of simple mechanical design and construction and which will accurately reproduce the colors in their true values.

Other objects of the invention and the novel features of construction, combinations and relations of parts by which the objects are attained are set forth or will appear in the course of the following specification.

The drawings accompanying and forming part of the specification illustrate the principle of the invention and various mechanical features of the same, but it will be appreciated that the actual physical embodiment may be varied, modified and changed all within the true spirit and broad scope of the claims defining the invention.

Fig. 1 in the drawings is a sectional and somewhat diagrammatic representation of a form of camera for practicing the invention.

Fig. 4 is a diagrammatic view of a modification.

Figure 2:
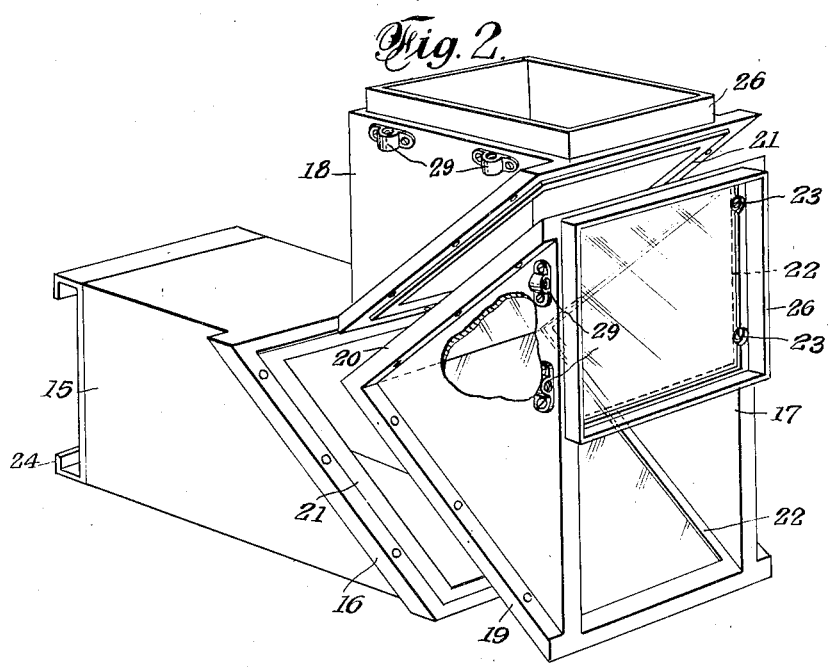
Fig. 2 is a broken perspective view illustrating in greater detail structural features, including particularly the sectional, prismatic construction of the camera box or body.

The invention, as disclosed in Fig. 1, involves a combination of reflecting and light transmitting mirrors, constituting also color filters, for two of the complementary color prints and a third color filter associated with a complementary color printer, these three color printers being positioned to receive the light directly or reflectively at substantially equal distances from the objective.

The first light transmitting and reflecting mirror is indicated at 5, interposed at a substantially 45° angle between the objective 6, and the first color printer 7. The second light transmitting and reflecting mirror is indicated at 8, disposed at a substantially 90° angle to the first mirror and directly in front of the second color printer 9. The third color printer is indicated at 10, at a substantially 45° angle in front of the second mirror 8. The first printer thus receives an image direct from the objective through the first mirror, the second printer receives the same object reflected the same total distance, from mirror 5, and the third printer receives the same object, the same total distance, doubly reflected from mirrors 5 and 8.

The first partial mirror is shown as carrying on the back of the same a color filter 11. Similarly the second partial mirror carries on its back a color filter 12, and the third color filter 13 is shown mounted directly in front of the third printer 10.

The special arrangement of the color filters and printers illustrated is important for securing the true values of the different colors. Thus the first filter 11 through which the rays pass directly to the first printer should be green and this accordingly fixes the first printer as the red printer. The second filter 12 is the red filter, which gives to the second printer the blue value. The third filter 13 is a blue-violet color and the third printer is a yellow printer. With this particular combination, the different colors can be reproduced in their natural values and strength and in proper combinations and shadings.

The reflectors are preferably silver surface mirrors, such as may be formed by fine chemical depositions of silver on polished glass surface and may be of varying density to give the desired balanced illumination. Thus the first or direct partial mirror may have a fairly dense surface, effecting a partial retardation of the light to the first negative, so as to balance this with respect to the singly and doubly reflected negatives.

The filters on the backs of the two mirrors and in front of the third printer are preferably what are known as the "A B C" balanced trichromatic filters, that is, the trichromatic green, the trichromatic red and the trichromatic blue.

Instead of being placed on the backs of the reflectors, the filters 11 and 12 may be incorporated in the glass of the mirrors 5 and 8. Thus mirror 5 may be the reflecting surface of a trichromatic green glass and mirror 8 be the reflecting surface of a trichromatic red glass. Similarly as to filter 13, this may be a trichromatic blue glass instead of merely a filter applied to the face of a glass support 14, such as indicated.

The surface mirrors avoid any refraction errors and in each instance, the light rays pass only through the color filter intended for the particular printer. The first or green filter, because of its direct relation, may be denser in the sense of being more of a reflector and less of a transmitter. The second or red filter on the other hand, may be less dense, that is less of a reflector and more of a light transmitter. The full values of the yellows are obtained with this arrangement, producing a much desired brilliancy of color in the finished prints.

Figure 3:
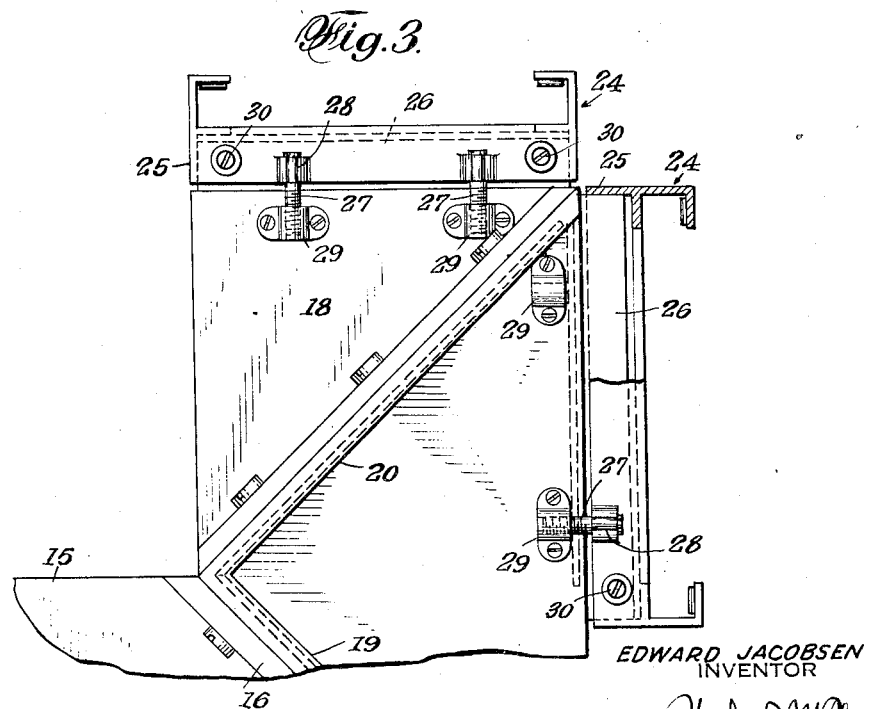
Fig. 3 is an enlarged broken sectional view illustrating particularly a form of adjustable mounting by which the plate holders may be adjusted, if required, to set them at the same focal distance from the objective.

For accurate, practical commercial manufacture, the camera may be constructed as illustrated in Figs. 2 and 3, that is, be made up of three separate angularly related co-fitting sections, the first a trapezoidal sided lower, main section 15, having a downwardly angled front end 16, the second an isosceles triangular sided section 17, with its lower face matching the inclined front of the main section and its hypothenuse forming an upwardly extending angular front for the main section and the third or top section 18, in the form of a smaller isosceles triangular sided section having its base matching the other, upper face of the intermediate section 17.

The 90° angled faces or sides 19, 20, of the intermediate camera section provide accurate mounting supports for the angularly related combination partial mirrors and filters and the vertical front wall of this unit provides a satisfactory support at the top for the third filter and a support at the bottom for the bellows of the objective.

The intermediate triangular section has a further supporting function in that it carries the mounting for the third plate holder. Thus this one unit definitely and accurately locates and positions all three filters, the two partial mirrors, the objective and the third plate holder. The other top, triangular unit 18, carries the second plate holder and the main unit 15, carries the first plate holder.

Accuracy and permanency of fit between the three camera sections, as well as light exclusion is assured in the illustration by rabbeted joints at the meeting faces of the three units, substantially as indicated at 21. The mirror and filter elements are accurately fitted and secured in the intermediate unit by providing shouldered seats 22, in which they are fixedly held as by overlying screw fastenings 23.

To correct for possible errors in registration, adjustment may be provided for one or more of the plate holder mounts. In general, the first plate holder may be fixedly mounted on the back of the main camera section and the other two be independently adjustable as by the construction shown in Fig. 3. As shown in this view, the plate holder mount 24 is constructed as an open frame to receive the plate holder and as having an inwardly projecting flange 25, slidably engaged over a rabbeted extension 26, on the camera. Screws 27, swivelled in lugs 28, at the sides of this telescopically mounted frame engage in screw lugs 29, on the camera body, enable in and out adjustment of these frames and lock screws 30, serve to secure the frames in the desired positions of adjustment.

To equalize for such refraction as may be introduced by passage of the light rays through the two partial mirrors, the construction may be modified as indicated in Fig. 4, by inclining the third color filter 13a, similarly to the other filters, at a substantially 45° angle to the yellow printer 10, the camera box being extended accordingly. This view also shows how in such case the intermediate camera unit 17a may be constructed, viewed in side elevation, as the three sides of a square figure carrying on these three sides the three color filters and a fourth unit 31, be added in the form of an isosceles triangle sided unit having its base matched to the third side of the second unit and its front side carrying the third plate holder mount.

The invention is of broad scope and the terms employed herein have therefore been used in a descriptive rather than in a limiting sense. Thus the expression "plate holder" has been used as a convenient way for describing the means for supporting the sensitized medium.

What is claimed is:

1. A one shot trichromatic camera, comprising in combination, an objective, a plate holder in direct alignment with said objective, an inclined trichromatic partial mirror and filter interposed between said objective and plate holder, a second plate holder in the path of reflected rays from said partial mirror, an inclined partial mirror and trichromatic filter in the path of said reflector rays and disposed substantially at a right angle to said first partial mirror and filter, a third plate holder in the path of said doubly reflected rays, a third trichromatic filter in front of said third plate holder, said third color filter being disposed at a right angle to the second color filter and partial mirror and the three filters arranged in planes forming together the three sides of a square figure.

2. A one shot trichromatic camera, comprising in combination, four independent sections separably secured together form a unitary structure and consisting of a main camera section having an inclined front end, an intermediate camera section having in side elevation three equal sides arranged as the three sides of a square and with one of the end sides matching the inclined end of the main section, a top section in the shape of a right isosceles triangle sided section having its base matching the intermediate sides of the intermediate section, a fourth section in the shape in side elevation of a right isosceles triangle having the base of the same matching the third side of the intermediate section and trichromatic color filters in the general planes of the three sides of the intermediate camera section.

3. A one shot trichromatic camera, comprising in combination, four independent sections separably secured together form a unitary structure and consisting of a main camera section having an inclined front end, an intermediate camera section having in side elevation three equal sides arranged as the three sides of a square and with one of the end sides matching the inclined end of the main section, a top section in the shape of a right isosceles triangle sided section having its base matching the intermediate side of the intermediate section, a fourth section in the shape in side elevation of a right isosceles triangle having the base of the same matching the third side of the intermediate section, light transmitting partial mirrors in the general planes of the first two sides of the intermediate section and a color filter in the general plane of the third side of the intermediate camera section.

4. A one shot trichromatic camera, comprising a plurality of separate independent box sections cooperable together to form a unitary camera shell and consisting of a main box section having a downwardly inclined front end, a separate intermediate box section having upper and lower convergent rearwardly inclined sides and a substantially vertical lower front portion, the lower inclined side of said intermediate box section matching the inclined front end of the main section and the lower vertical front portion then forming a vertically extending front for the main section in line with said main section, a separate top box section having horizontal top and vertical back sides connected by a lower rearwardly inclined front side matching the upper rearwardly inclined side of the intermediate box section, coacting interfitting means at said matching sides of said main, intermediate and top box sections for relatively positioning and securing said sections assembled in definite fixed relation forming a unitary camera shell, seats at said inclined matched sides of said box sections and relatively inclined reflectors disposed in said seats and so located in desired angled relation in the camera.

5. A combination as in claim 4, in which the intermediate box section has a seat in the upper portion of the same above the lower vertical front portion and a color filter secured in definitely fixed relation in said seat and in line with the upper inclined reflector.

6. A combination as in claim 4, in which the lower front portion of the intermediate box section is the lower part of a vertical front side connecting the rearwardly inclined sides of the intermediate box section, the upper portion of said vertical front side having a seat and a color screen mounted in and definitely located by said seat in line with the upper inclined reflector.

EDWARD JACOBSE